United States Patent
Chengalvarayan

[11] Patent Number: 6,076,058
[45] Date of Patent: Jun. 13, 2000

[54] LINEAR TRAJECTORY MODELS INCORPORATING PREPROCESSING PARAMETERS FOR SPEECH RECOGNITION

[75] Inventor: Rathinavelu Chengalvarayan, Lisle, Ill.

[73] Assignee: Lucent Technologies Inc., Murray Hill, N.J.

[21] Appl. No.: 09/032,900

[22] Filed: Mar. 2, 1998

[51] Int. Cl.[7] .................................................. G10L 15/14
[52] U.S. Cl. ...................... 704/256; 704/243; 704/202; 704/201
[58] Field of Search ................................ 704/243, 256, 704/202, 201

[56] References Cited

U.S. PATENT DOCUMENTS

| | | | |
|---|---|---|---|
| 5,579,436 | 11/1996 | Chou et al. | 704/256 |
| 5,606,644 | 2/1997 | Chou et al. | 704/256 |
| 5,794,194 | 8/1998 | Takebayashi et al. | 704/251 |
| 5,835,890 | 11/1998 | Matsui et al. | 704/255 |

OTHER PUBLICATIONS

"HMM based S.R using state . . . on mel–warped DFT features" Chengalvarayan IEEE pp. 243–255, May 1997.
Matsui et al. "a study of speaker adaptation based on minimum classification error training", 1995.
Rathinavelu et al. "the trended HMM with discrinative training for phonetic classification", Oct. 1996.
Takahashi et al. "Minimum classification error training for a small amount of data enhanced by vector field–smoothed bayesian learning", Mar. 1996.

*Primary Examiner*—David R. Hudspeth
*Assistant Examiner*—Daniel Abebe
*Attorney, Agent, or Firm*—Jack R. Penrod

[57] ABSTRACT

The proposed model aims at finding an optimal linear transformation on the Mel-warped DFT features according to the minimum classification error (MCE) criterion. This linear transformation, along with the (NSHMM) parameters, are automatically trained using the gradient descent method. An advantageous error rate reduction can be realized on a standard 39-class TIMIT phone classification task in comparison with the MCE-trained NSHMM using conventional preprocessing techniques.

4 Claims, 4 Drawing Sheets

| TYPE OF MODEL | NSHMM (ML) | NSHMM (MCE) | TNSHMM |
|---|---|---|---|
| P = 0 | 53.07% | 63.98% | 66.16% |
| P = 1 | 54.11% | 69.33% | 71.84% |

*FIG. 4*

LINEAR TRAJECTORY MODELS INCORPORATING PREPROCESSING PARAMETERS FOR SPEECH RECOGNITION

FIELD

This invention relates to speech recognition and more particularly to the use of both front-end feature extraction and back-end classification techniques in speech recognition.

BACKGROUND

The recent advent of discriminative feature extraction has shown that improved recognition results can be obtained by using an integrated optimization of both the preprocessing and classification stages. Previous studies have also demonstrated that Mel-warped discrete fourier transform (DFT) features, subject to appropriate transformation in a state-dependent manner, are more effective than the conventional, model-independent speech features, called Mel-frequency cepstral coefficients (MFCCs). To further the improvements in the speech recognition field, it is desirable to use optimization of both preprocessing and classification in speech recognition methods and systems.

SUMMARY OF THE INVENTION

Briefly stated, in accordance with one aspect of the invention, the aforementioned problem is overcome and an advancement in the art is achieved by providing a speech recognition apparatus, which includes means for determining a minimum classification error criterion and means for determining an optimal linear transformation on the Mel-warped DFT features according to the minimum classification error (MCE) criterion.

In accordance with another aspect of the invention, an apparatus that has a model that finds an optimal linear transformation on Mel-warped DFT features according to a minimum classification error (MCE) criterion. This linear transformation, along with nonstationary state model parameters, are automatically trained using a gradient descent procedure.

In accordance with another aspect of the invention, a method for speech recognition is provided which has the steps of: digitizing and framing a speech utterance token; transmitting this digitized and framed speech utterance token to Mel-filter banks; Mel-filtering the digitized and framed utterance token to produce log energy vectors for the number of classes C; transmitting a sequence of log energy vectors according to the frames to compute feature transformation operation; computing feature transformations for each class i of the utterance token and transmitting the result to next operation; computing static and dynamic features therefrom and transmitting the result to next operation; and calculating a respective log likelihood for each of the utterance tokens Pi and transmitting the result to next operation. This method also includes the further steps of testing the token $P_j$ to see if it is less than S and if it is, then the method branches to the next testing operation and if $P_j$ is equal to S then setting index j equal to class index i and proceeding to the next testing operation; testing to see if index i is less than the number of classes C, if yes then iterating the index i by one and proceeding back to the computing feature transformations for each class i step and repeating this iteration and return until the expression i<C is false, which means all classes i have been processed; if index i is not less than the number of classes C, then classification of this utterance token is finished and aj-th class is recognized for this given token; testing to see if this is the last utterance token to be processed and if it is the last then proceeding to done, otherwise returning to the digitizing and framing step to begin processing a subsequent utterance token.

BRIEF DESCRIPTION OF THE DRAWING

FIG. 4 is a table of results from applying the method of speech recognition.

DETAILED DESCRIPTION

Figure 1:
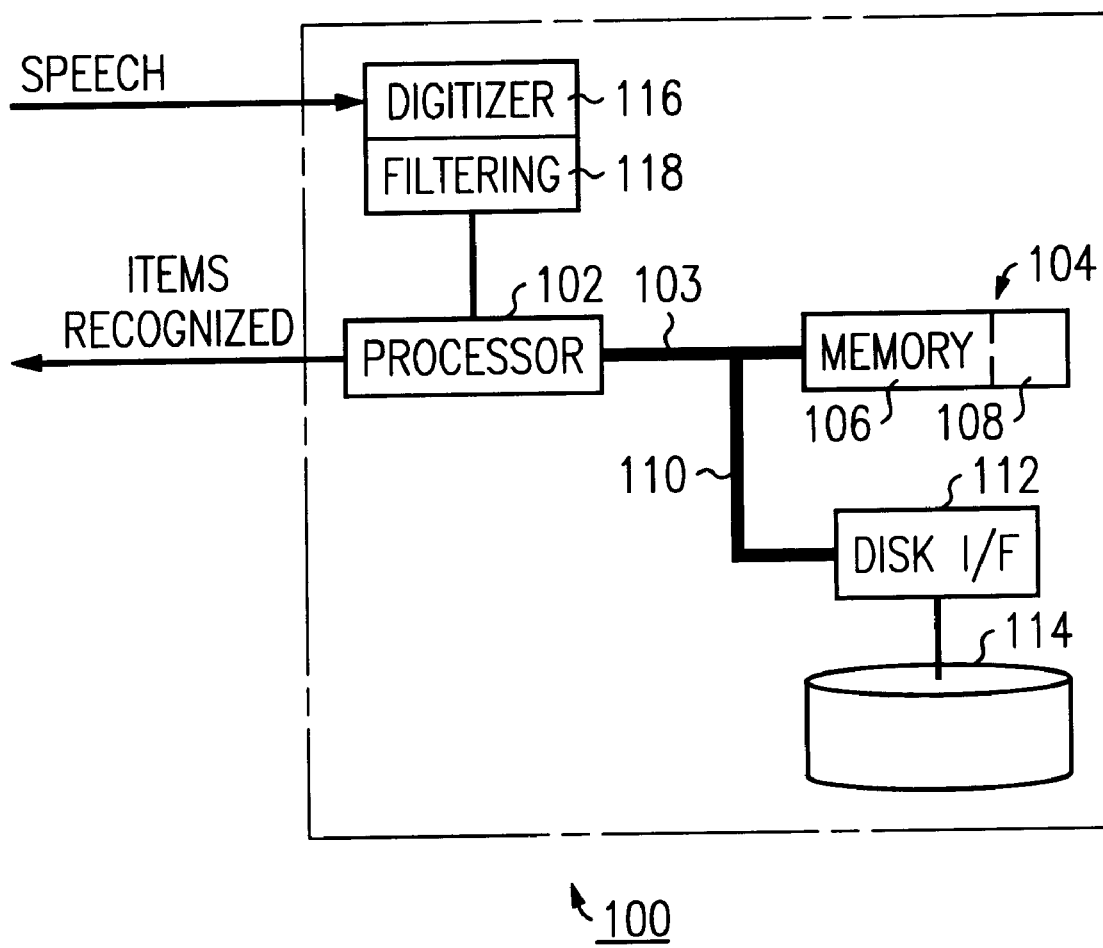
FIG. 1 is a block diagram of a computer system capable of performing the steps necessary to provide speech recognition according to the present invention.

Referring now to FIG. 1, a system 100 for speech recognition has a processor 102 which executes program instructions and processes data to provide the speech recognition. The program instructions and data are stored in memory 104 and/or in disk 114, which is a mass storage unit. Memory 104 typically is partly RAM 106 and partly ROM 108, although it can be all RAM if the non-volatile data is stored in a non-volatile device such as disk 114. The processor 102 is connected to memory 104 via bus 103 and to disk interface 112 via bus 103 and bus 110.

The input to the processor is human speech. To handle this analog speech by means of digital processor 102, digitizer (e.g. analog to digital converter) 116 is used to convert the analog speech into digital signals. The digitizer 116 is closely followed by a filtering unit 118, which cleans up the digital waveform and thereby reduces logical errors. Out of filtering unit 118 are processed and clean digital signals that are connected to processor 102 for further processing and switching.

Figure 2:
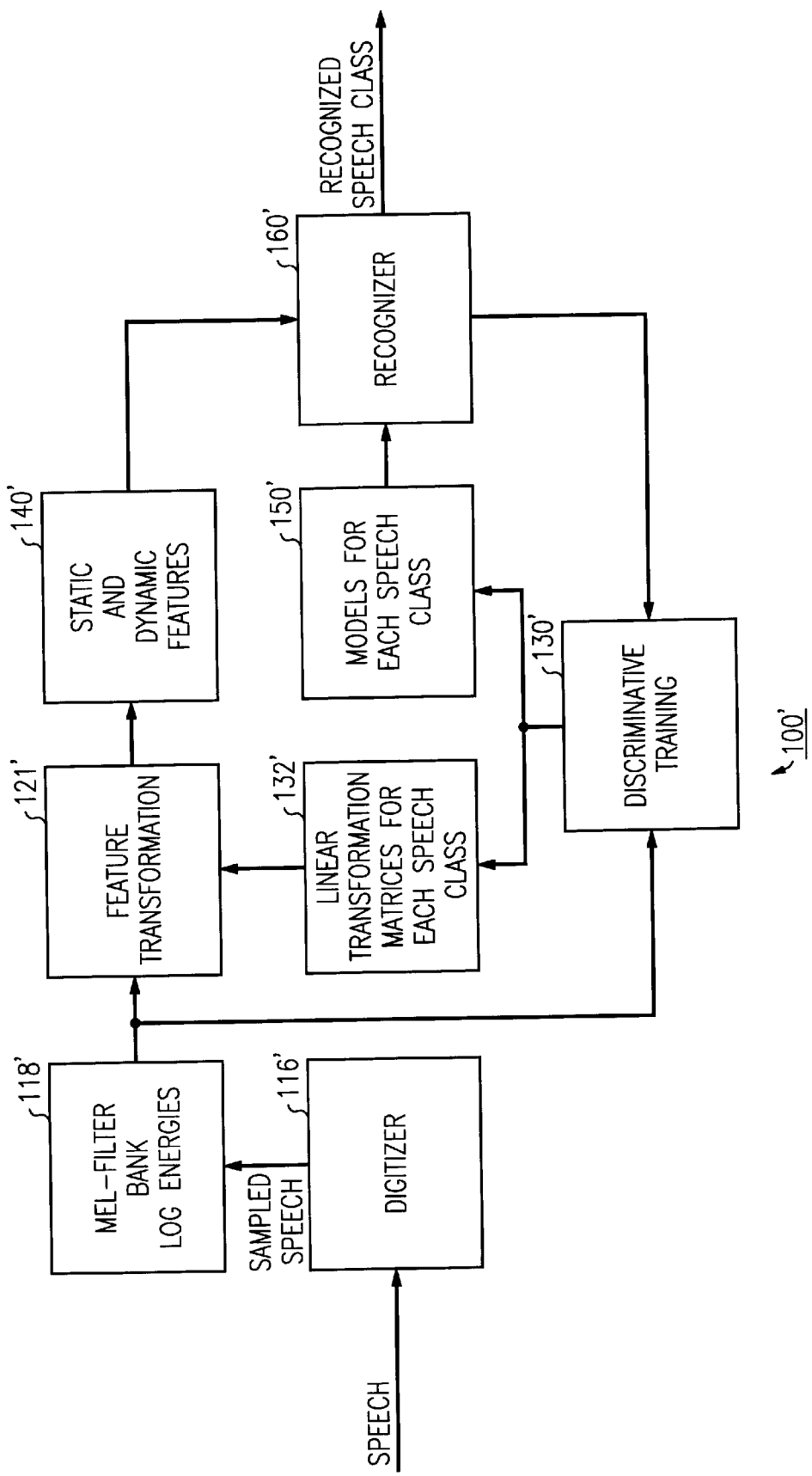
FIG. 2 is a detailed block diagram of the system of FIG. 1 under program control.

Referring now to FIG. 2, the use of system 100 to provide a speech recognition system 100' will be described in greater detail. The use of feature space transformations is a necessary step for feature extraction in speech recognition system 100'. To this end, the MFCCs use discrete cosine transform (DCT) as a linear operator to map mel-warped DFT (in the form of mel-filter bank log channel energies from filtering unit 118') into a lower dimensional feature space. To construct a theoretically optimal transformation, in this application a new statistical model of speech, called optimum-transformed nonstationary state HMM (TNSHMM), was developed with the optimality of the transformation defined according to the minimum classification error (MCE) criterion.

The state-dependent transformation on the mel-warped DFT, together with the nonstationary state HMM parameters, is automatically trained using the gradient descent method, resulting in minimization of a measure of an overall empirical error count. The proposed method is tested on a speech recognition system using different types of nonstationary state hidden Markov models. The comparison with standard preprocessing techniques has shown that the newly developed method provides an error rate reduction in all the performed experiments. FIG. 2 and system 100' will be described in greater detail after the following mathematical exposition.

One task in developing the desired speech recognizer is to achieve the optimal construction of linear transforms used. To this end, let $F=F_1, F_2, \ldots, F_T$ denote the mel-filter-bank (MFB) log-energy (mel-warped DFT) n-dimensional vector-valued sequence having a length of T frames. The NSHMM described herein integrates the input features into the modeling process using a set of state-dependent transformation matrices as trainable parameters of the model. The new transformed static feature vector $X_t$ at time frame t is a state (i) dependent linear transformation of the MFB log channel energy vector at time t, obtained according to $$X_{p,i} = \sum_{q=1}^{p} W_{p,q,i} \mathcal{F}_{q,i} \quad p = 1, 2, \ldots, d, \quad t = 1, 2, \ldots, T$$

where $W_{p,q,i}$ is the pq-th element of the transformation matrix $W_i$ associated with the Markov state i, n is the number of MFB log channel energies for each frame, and d is the vector size of the transformed static feature. Given the transformed static features as described above, the dynamic feature vectors $Y_t$ are constructed in a conventional way according to $$Y_t = X_{t+2} - X_{t-2}$$
$$= W_i F_{t+2} - W_i F_{t-2}$$
$$= W_i [F_{t+2} - F_{t-2}].$$

The augmented static and dynamic features are provided as the data input for every frame of speech into the modeling stage. A Gaussian density associated with each state i assumes the form $$b_i(O_t) = b_i(X_t Y_t)$$
$$= b_i(X_t) + b_i(Y_t)$$

where $O_t$ is the augmented feature vector at frame t, $b_i(X_t)$ and $b_i(Y_t)$ are d-dimensional, and the unimodal Gaussian densities, variables X and Y indicate the static and the dynamic features.

Another task of the speech recognizer according to the present invention is parameter estimation of linear transformation matrices. To this end, the formulation of the trajectory-based HMM or nonstationary-state HMM has been successfully used in automatic speech recognition applications for the past few years. The trended HMM is of a data-generative type and can be described as $$O_t = \sum_{p=0}^{P} \mathcal{B}_i(p)(t - \tau_i)^p + \mathcal{R}_t(\Sigma_i);$$

where $O_t$, $t=1, 2, \ldots, T$ is a modeled observation data sequence of length T, within the HMM state indexed by i; $B_i(p)$ are state-dependent polynomial regression coefficients of order P indexed by state i; and the term $R_t$ is the stationary residual assumed to be independent and identically distributed (IID) and zero-mean Gaussian source characterized by state-dependent, but time-invariant covariance matrix $\tau_i$. The term $t-\tau_i$ represents the sojourn time in state i at time t, where $T_i$ represents the time when state i in the HMM is just entered before a regression on time takes place. Each model state is characterized by a multivariate Gaussian density function with diagonal covariance matrices in the form $$b_i(O_t | \tau_i) = \frac{(2\pi)^{-\frac{d}{2}}}{|\Sigma_i|^{\frac{1}{2}}} \exp\left(-\frac{1}{2}\left[O_t - \sum_{p=0}^{P} \mathcal{B}_i(p)(t - \tau_i)^p\right]^{Tr}\right.$$
$$\left.\Sigma_i^{-1}\left[O_t - \sum_{p=0}^{P} \mathcal{B}_i(p)(t - \tau_i)^p\right]\right)$$

where $B_i(p)$, $\Sigma_i$ denote the polynomial means and variances of the i-th state of the model, $(t-\tau_i)$ is the sojourn time in state i at time t and d is the dimensionality. Superscripts Tr,−1 and the symbol ∥denote the matrix transposition, inversion and determinant respectively. Based on the model j, optimum state sequence $\Theta^j = O_1, O_2, \ldots, O_T$ for an input token $O=O_1, O_2, \ldots, O_T$ with T frames is obtained by means of the Viterbi algorithm [3]. Then, the log-likehood is given by $$g_j(O, \Phi) = \sum_{j=1}^{T} \log b_{\theta_j^c}(O_\lambda | \tau_{\theta_j^c}).$$

In the next section, a discriminative training process is briefly summarized for achieving optimal accuracy in estimating the state-dependent transformation matrix coefficients. Let $\Phi j$, $j=1, 2, \ldots, K$ denote the HMM for the j-th class, where K is the total number of classes. The classifier based on these K class-models is defined by $\Phi = \{\Phi_1, \Phi_2, \ldots, \Phi_K\}$. The purpose of discriminative training is then to find the parameter set $\Phi$ such that the probability of misclassifying all the training tokens is minimized. Let $g_j(O, \Phi)$ denote the log-likelihood associated with the optimal state sequence $\Theta$ for the input token O, obtained by using the Viterbi algorithm based on the HMM $\Theta_j$ for the j-th class. Then, for an utterance O from class c the misclassification measure $d_c(O, \Phi)$ is defined as $$d_c(O, \Phi) = -g_c(O, \Phi) + g_\chi(O, \Phi),$$

$\chi$ denoting the incorrect model with the highest log-likelihood. A loss function with respect to the input token is finally defined in terms of the misclassification measure to be given as $$\mathcal{T}(O, \Phi) = \frac{1}{1 + \varepsilon^{-d_c(O, \Phi)}},$$

which projects $d_c(O, \Phi)$ into the interval $[0, 1]$. Let $\phi$ be any parameter of the model $\Phi$. Provided $Y(O, \Phi)$ is differentiable with respect to $\phi$, the parameter can be adjusted according to $$\hat{\phi} = \phi - \varepsilon \frac{\partial \mathcal{T}(O, \Phi)}{\partial \phi}$$
$$\hat{\phi} = \phi - \varepsilon \underbrace{\mathcal{T}(O, \Phi)(\mathcal{T}(O, \Phi) - 1)}_{\psi} \frac{\partial d_c(O, \Phi)}{\partial \phi}.$$

Here $\hat{\phi}$ is the new estimate of the parameter and S is a small positive constant. By applying the chain rule to the results in the equation immediately above, the gradient calculation of i-th state parameter $W_{i,j}$ for the j-th model becomes $$\frac{\partial \mathcal{T}(O,\Phi)}{\partial \mathcal{W}_{i,j}} = \psi \frac{\partial d_c(O,\Phi)}{\partial \mathcal{W}_{i,j}}$$

$$= \psi \frac{\partial}{\partial \mathcal{W}_{i,j}}(-g_c(O,\Phi) + g_x(O,\Phi))$$

$$= \psi \frac{\partial}{\partial \mathcal{W}_{i,j}}\left(-\sum_{t=1}^{T} \log b_{\theta_t^c}(O_t|\tau_{\theta_t^c}) + \sum_{t=1}^{T} \log b_{\theta_t^x}(O_t|\tau_{\theta_t^x})\right)$$

$$= \psi_j \sum_{t \in T_i(j)} \left( \Sigma_{x,i,j}^{\pm}\left[X_t - \sum_{p=0}^{P}\hat{\mathcal{B}}_{x,i,j}(p)(t-\tau_i)^p\right][\mathcal{F}_t]^{Tr} + \Sigma_{y,i,j}^{\pm}\left[Y_t - \sum_{p=0}^{P}\hat{\mathcal{B}}_{y,i,j}(p)(t-\tau_i)^p\right][\mathcal{F}_{t+2} - \mathcal{F}_{t-2}]^{Tr}\right)$$

where the adaptive step size is defined as $$\psi_j = \begin{cases} \psi & \text{if } j = c \text{ (correct-class)} \\ -\psi & \text{if } j = x \text{ (wrong-class)} \\ 0 & \text{otherwise} \end{cases}$$

the variables $\chi$ and Y indicate the static and dynamic features, respectively. The set $T_i(j)$ includes all the time indices such that the state index of the state sequence at time I belongs to state i in the N-state Markov chain $$T_i(j) = \{t | \theta_t^j = i\}, \quad 1 \le i \le N, \quad 1 \le t \le T.$$

The simplified gradient descent algorithm is iteratively applied to all training tokens, sequentially, to minimize the loss function during the training process.

Referring again to FIG. 2, a specific embodiment 100' of a speech recognition system will be described. Speech recognition system 100' has a speech digitizer 116' that is very similar to digitizer 116 in FIG. 1. Out of speech digitizer 116' is digitized speech presented in sequential frames much the same as the output of digitizer 116 of FIG. 1. The output of speech digitizer 116' is transmitted to block 118' which has Mel filter banks and determines log energies for each frame. This is a known way for obtaining a Mel-warped discrete Fourier transform (DFT). Thus, the Mel filtered log energies at the output of block 118' are a Mel-warped DFT. This output is transmitted to one input of block 121' which will be explained further below. The output of block 118' is also transmitted to discriminative training block 130'. The purpose of discriminative training block 130' is to determine a parameter set such that the probability of misclassifying all the training tokens is minimized. The input from block 118' is the primary input, but a second input, which is a feedback input from recognizer block 160', has some influence in helping to minimize the probability of misclassifying the training tokens.

The output of the discriminative training block 130' is the aforementioned set of probabilities that is transmitted in parallel to block 132' and block 150'. Block 132' takes this set of probabilities developed during training and determines state-dependent transformation matrix coefficients which provide linear transformation matrices for each speech class and provides these as a second input to feature transformation block 121'. Thus, there is some influence from training on the feature transformation by block 121'. Block 121' performs a feature transformation upon the Mel-warped DFT to move the feature space lower with the influence of the training. After the feature transformation by block 121', the results are transmitted to block 140' where static and dynamic features are extracted. The extracted features are transmitted to one input of speech recognizer 160'. This is a fairly normal connection.

A second input of speech recognizer 160' is connected to the output of block 150, which will be explained more fully at this time. As mentioned previously, block 150 receives the output of discriminative training block 130'. Block 150' from the discrminative training output and trended hidden Markov models for each speech class provides to speech recognizer 160' trended HMMs for each class that have been influenced by training. Thus the influence of training occurs in two different portions of the speech recognizer system 100' and improves the speech recognition as will be explained more fully later along with some experimental results.

Figure 3:
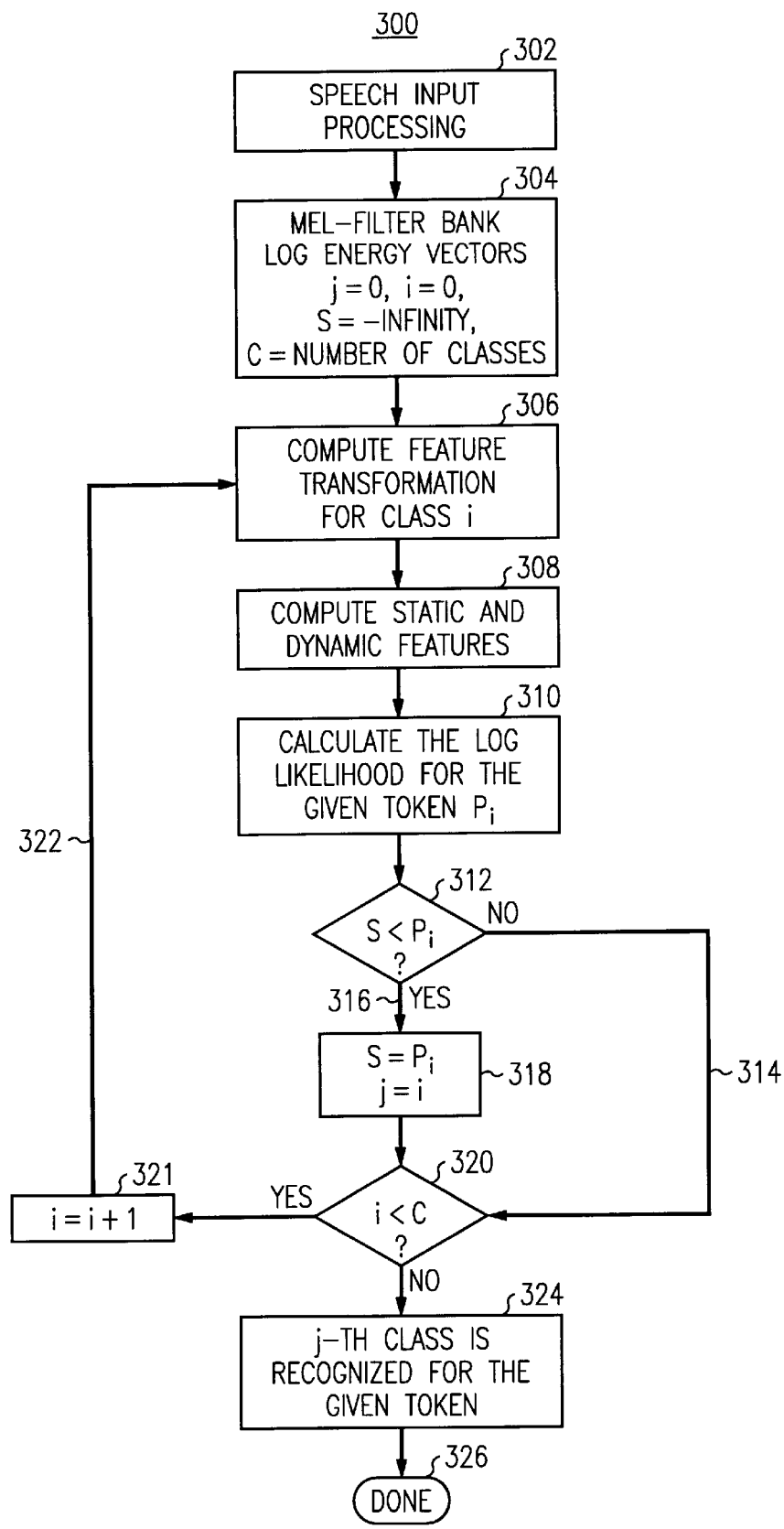
FIG. 3 is a logic flow diagram of a method of speech recognition according to the invention.

Referring now to FIG. 3, a method 300 for speech recognition according to the present invention will be described. An utterance is introduced to and processed, e.g. digitized and framed, by operation 302. The processed and framed output is transmitted to operation 304. Operation 304 receives and filters this input with Mel-filter bank producing log energy vectors for the number of classes used by the recognizer. A sequence of log energy vectors according to the frames are transmitted to operation 306. Operation 306 computes feature transformation for class i. The feature transformation of the log energy vectors is then transmitted to operation 308. Operation 308 takes the feature transformation and computes static and dynamic features therefrom and transmits the result to operation 310. Operation 310 receives the static and dynamic features and from them calculates a respective log likelihood for each of the utterance tokens $P_i$. The result of operation 310 is transmitted to operation 312. Operation 312 is a test operation. Operation 312 the token $P_i$ is compared to a threshold value S. If $P_i$ is less than S, then the method 300 branches along path 314 to operation 320. If $P_i$ is equal to S (the end condition) then index j is set equal to class index i and the method proceeds to operation 320. Operation 320 tests to see if index i is less than the number of classes C, if yes then method 300 proceeds to operation 321 which iterates the index i by one, then proceeds back along path 322 to operation 306 to process the next class. Thus, operations 306–320 are performed until all classes have been processed, i.e. when the expression i<C is false. Then the classification of this utterance token is finished and the method proceeds to operation 324 where the j-th class is recognized for the given token. If this is the only token to be processed, then the method is done and progresses to final operation 326, if there is a subsequent token to process, then the method will return to operation 302 to process the next utterance token, recognize and classify it.

In Operation

The TNSHMM described above is evaluated on a standard TIMIT speaker independent database, aiming at classifying 61 quasi-phonemic TIMIT labels folded into 39 classes. The TIMIT database with a total of 462 different speakers is divided into a training set and a test set with no overlapping speakers. The training set consists of 442 speakers with a total 3536 sentences and the test set consists of 160 sentences spoken by the 20 remaining speakers. Mel-filter bank (MFB) log-channel energies, are computed by simulating 21 triangular filters spacing linearly, from 0 to 500 Hz, and exponentially, from 500 Hz to 8500 Hz, and overlapped by 50% for every 10 ms of speech. For the TNSHMM, only these MFB log channel energy vectors are used as the raw data to the recognizer. All the feature parameters are automatically constructed within the recognizer. Each phone is represented by a simple left-to-right, 3-state HMM with Gaussian state observation densities. For context-independent model, a total of 39 models (39×3=117 states) were constructed, one for each of the 39 classes intended for the classification task. For the MCE approach, the initial model is trained using the ML criterion. The state-dependent transformation matrix is initialized by the DCT matrix:

$$\mathcal{A}_{p,q} = \cos\left[p(q-0.5)\frac{\pi}{n}\right] \quad p=1,2,...,d \quad q=1,2,...,n$$

where A denotes the d×n DCT matrix and d is the dimensionality of the static feature vector. Experimental operation was run with d=12, which makes the dimensions of the linear transformation matrix to be 12×21. Note that the above initialization of the transformation matrix by DCT matrix without further training gives rise to the traditional MFCC feature parameters. The state-dependent transformation matrices, polynomial coefficients and diagonal covariances of the TNSHMMs are preferably further trained employing the MCE optimization procedure. A total of five epochs are performed and only the best-incorrect-class is used in the misclassification measure.

Several sets of experiments were run to evaluate the phonetic classifiers that were constructed using two types of HMMs (stationary state P=0 and nonstationary state P=1) and two types of training (ML and MCE). The experimental results for various experimental conditions are summarized in the Table shown in FIG. 4. The NSHMM (ML) is trained using 5-iterations of modified Viterbi re-estimation and NSHMM (MCE) is obtained by discriminative training. As can be seen from the Table, the performance is significantly improved by the MCE training method. The MCE-based classifier achieves an average of 28% classification error rate reduction, uniformly across both types of speech models over the ML-based classifier. For the ML and MCE based classifier (see the Table), the nonstationary state HMM is superior to the stationary state HMM, consistent with our earlier finding based on the same evaluation task. For the TNSHMM, the initial state-dependent DCT matrices are discriminatively trained according to the gradient decent method. The results corresponding to P=0 (66.16%) indicate a significant reduction in error rate (6%) compared to the 63.98% result. Similarly the results corresponding to P=1 (71.84%) indicate a significant reduction in error rate (8%) compared to the 69.33% result. It also represents a 17% error rate reduction compared with the corresponding TNSHMM with P=0 (66.16%). The best result is achieved by incorporating state-dependent linear transforms and using a combination of the nonstationary state HMM and the MCE training algorithm. The results clearly demonstrated the effectiveness of new approach in achieving enhanced discrimination ability.

The experiments have shown that this new technique for discriminative feature extraction from the mel-warped log channel energies computed directly from short-time DFTs of the speech waveform; and that this feature-extraction technique when the design is integrated with the nonstationary state HMM-based speech recognizer. The preprocessing component (state-dependent linear transformation matrices) and the modeling component (state-dependent polynomial coefficients) of the recognizer in this method and apparatus are jointly trained with a discrimination-motivated MCE algorithm. A series of phone classification experiments have been made using TIMIT to evaluate the performance of the NSHMMs. The experimental results show that use of the state-dependent transformation on Mel-warped log channel energies is superior in performance to the conventional use of the MFCCs which are not subject to optimization together with the model parameters in training. The overall result was an error rate reduction of 8% on a standard 39-class phone classification task in comparison with the conventional MCE-trained NSHMM using MFCCs.

What is claimed is:

1. A method for speech recognition comprising the steps of:

digitizing and framing a speech utterance token;

transmitting said digitized and framed speech utterance token to Mel-filter banks;

Mel-filtering the digitized and framed utterance token to produce log energy vectors for the number of classes C;

transmitting a sequence of log energy vectors according to the frames to compute feature transformation operation;

computing feature transformations for each class i of the utterance token and transmitting the result to next operation;

computing static and dynamic features therefrom and transmitting the result to next operation;

calculating a respective log likelihood for each of the utterance tokens Pi and transmitting the result to next operation;

testing the token Pi to see if it is less than S and if it is, then the method branches to the next testing operation and if Pi is equal to S then setting index j equal to class index i and proceeding to the next testing operation;

testing to see if index i is less than the number of classes C, if yes then iterating the index i by one and proceeding back to the computing feature transformations for each class i step and repeating this iteration and return until the expression i<C is false, which means all classes i have been processed;

if index i is not less than the number of classes C, then classification of this utterance token is finished and a j-th class is recognized for this given token;

testing to see if this is the last utterance token to be processed and if it is the last then proceeding to done, otherwise returning to the digitizing and framing step to begin processing a subsequent utterance token.

2. An apparatus for speech recognition comprising:

means for determining a minimum classification error criterion; and means for determining an optimum transformed nonstationary state hidden Markov model according to the minimum classification error (MCE) criterion;

wherein said means for determining an optimum transformed nonstationary state hidden Markov model includes a linear transformation based on Mel-warned DFT features.

3. The apparatus of claim 2, further comprising:

means for automatically training said optimum transformed nonstationary state hidden Markov model.

4. The apparatus of claim 3, wherein said means for automatically training uses gradient decent techniques in said automatic training.

* * * * *

UNITED STATES PATENT AND TRADEMARK OFFICE
CERTIFICATE OF CORRECTION

PATENT NO. : 6,076,058  
DATED : June 13, 2000  
INVENTOR(S) : Rathinavelu Chengalvarayan Page 1 of 1

It is certified that error appears in the above-identified patent and that said Letters Patent is hereby corrected as shown below:

Column 8, claim 2,
Line 58, change "Mel-warned" to -- Mel-warped --.

Signed and Sealed this

Twenty-seventh Day of November, 2001

*Attest:*

*Nicholas P. Godici*

NICHOLAS P. GODICI
*Acting Director of the United States Patent and Trademark Office*

*Attesting Officer*